Aug. 4, 1953   J. S. MICHIE   2,647,965
CONSTANT TENSION MEANS WITH MECHANOELECTRICAL
TORQUE-RESPONSIVE CONTROL
Filed April 21, 1950   2 Sheets-Sheet 1

INVENTOR.
JOHN S. MICHIE,
BY:
Harold B. Hood.
ATTORNEY.

Aug. 4, 1953
J. S. MICHIE
2,647,965
CONSTANT TENSION MEANS WITH MECHANOELECTRICAL
TORQUE-RESPONSIVE CONTROL
Filed April 21, 1950
2 Sheets-Sheet 2
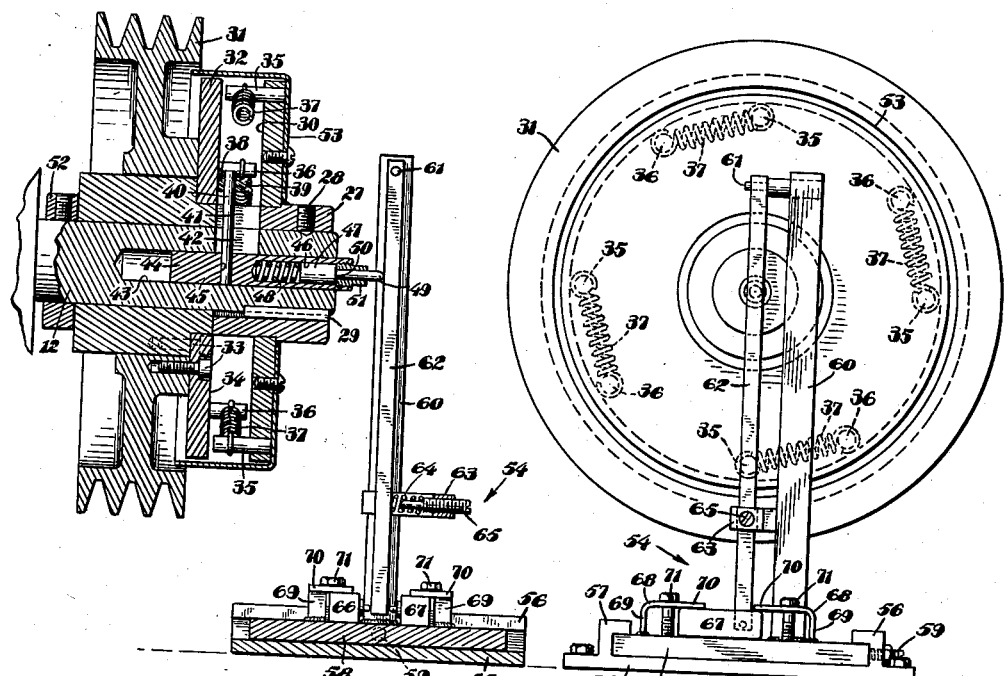
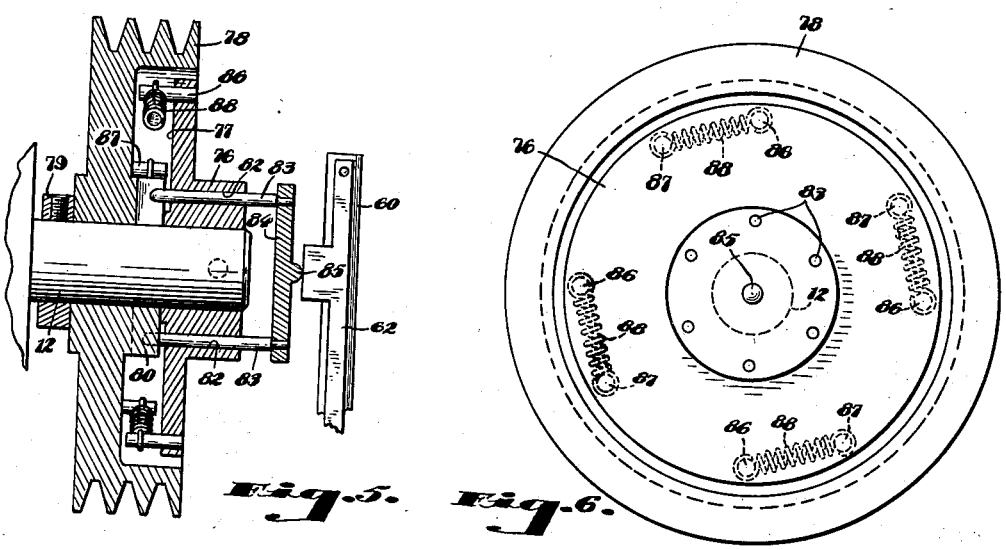
INVENTOR.
John S. Michie,
BY:
Harold B. Hood.
ATTORNEY.

Patented Aug. 4, 1953

2,647,965

UNITED STATES PATENT OFFICE 2,647,965

CONSTANT TENSION MEANS WITH MECHANOELECTRICAL TORQUE - RESPONSIVE CONTROL

John S. Michie, Columbus, Ind., assignor to Reeves Pulley Company, Columbus, Ind., a corporation of Indiana Application April 21, 1950, Serial No. 160,231

10 Claims. (Cl. 200—52)

The present invention relates to an improved torque-responsive control means for a variable speed transmission of the type having an element movable to vary the ratio between the speeds of the input shaft and the output shaft thereof.

The primary object of this invention is to provide a simplified, relatively inexpensive control of the character described, readily adaptable to any conventional variable speed transmission with a minimum of time and effort.

A further object is to provide such a control, which, while relatively simple in its structural details, will, nevertheless, respond to the slightest change in load impressed upon the output shaft to vary the speed ratio of the transmission, thereby maintaining a constant application of torque to the driven load.

A still further object is to provide simple, easily adjustable means for varying the degree of sensitivity at which the control will operate and, within a given range, to vary the torque value which will be maintained by the control.

Further objects will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 2 is an enlarged, longitudinal sectional view of one form of my control;

Fig. 3 is an end elevation thereof;

Fig. 5 is a longitudinal sectional view of a modified form of my invention;

Fig. 6 is an end elevation thereof; and

Figure 1:
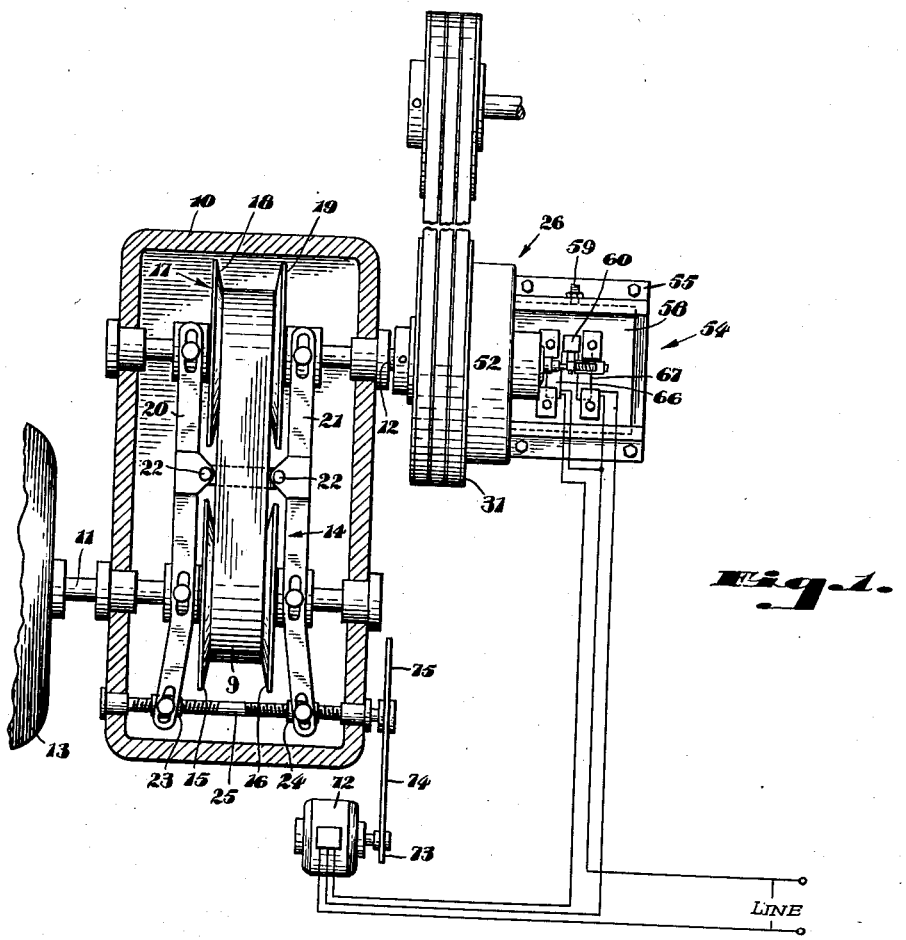
Fig. 1 is a plan view, more or less diagrammatic, of one conventional type of variable speed transmission, with my control operatively associated therewith.

Referring now to the drawings and more particularly to Fig. 1, I have shown diagrammatically a conventional type of variable speed transmission having a frame 10, with an input shaft 11 and an output shaft 12 journalled therein. An electric motor or other form of motive power 13 is operatively connected to the input shaft 11.

Keyed to the input shaft 11 is an expansible V-pulley 14, comprising axially-shiftable driving cones 15 and 16. Keyed to the output shaft 12 is another expansible V-pulley 17, comprising axially-shiftable driving cones 18 and 19.

A lever 20 is operatively associated with cone 15 of pulley 14 through the medium of a suitable bearing, and similarly connected to cone 18 of pulley 17. A similar lever 21 is similarly connected to cones 16 and 19 of pulleys 14 and 17, respectively; said levers being respectively fulcrumed at 22, 22 in the manner familiar to those skilled in the art.

One end of each of the levers 20 and 21 extends beyond the pulley 14; and the lever ends are respectively operatively associated with nuts 23 and 24, one of said nuts having a right-hand thread, and the other having a left-hand thread. The nuts 23 and 24 are threaded upon oppositely-threaded sections of a shaft 25, journalled in frame 10. One end of said shaft 25 extends without the frame 10. An edge-active belt 9 provides a driving connection between the pulleys 14 and 17.

Rotation of the shaft 25 in one direction will bring the nuts 23 and 24 and the associated ends of levers 20 and 21 closer together, causing the cones 15 and 16 of pulley 14 to converge and cones 18 and 19 of pulley 17 to separate, thereby increasing the speed of the output shaft. Opposite rotation of shaft 25 will cause a decrease in the speed of the output shaft.

In the disclosed embodiment of my invention, I have mounted my torque-responsive means 26 on the output shaft of the variable speed transmission. From the following description, it will appear obvious that it could just as effectively be mounted on the input shaft, or on an intermediate jack shaft between the output shaft and the driven object. But I presently believe the arrangement shown in the drawings to provide an optimum location for the torque-responsive unit and have so illustrated and described my invention.

Torque-responsive means 26, in my preferred embodiment, is secured to the output shaft 12 through the medium of a rotor 27 fixedly secured near the outboard end of said shaft by means of a set screw 28 or the like and a key 29. The rotor 27, intermediate the ends thereof, presents a face 30, on the side of said rotor remote from the outboard end of the output shaft and perpendicular to the axis of said shaft. Loosely journalled upon the output shaft abutting the inboard end of the rotor 27 is a torque transfer means 31. Said means may take any form, such as that of a flat-faced pulley, a gear, or a V-type, grooved pulley such as I have shown. A disc 32, integral with or secured to said torque transfer means by screws 33 or the like, presents a face 34 substantially parallel with and spaced from face 30.

A plurality of pins 35 arranged in a peripherally-spaced series, substantially parallel to the axis of the output shaft, are carried on and project from the face 30 toward the face 34. An equal number of pins 36, substantially parallel to the pins 35, are carried on and project from the face 34 toward the face 30 and are staggered with respect to pins 35. Secured between adjacent pins 35 and 36 are coiled springs 37 or the like, extending from pins 36 to pins 35 in the direction of rotation of the output shaft 12, thereby providing a resilient drive between the rotor 27 and torque transfer means 31 of such character as to permit resiliently-resisted relative rotary movement between the rotor and the torque transfer means. Relative rotary movement between the rotor and the torque transfer means will result from a difference between the load impressed upon the torque transfer means 31 and the torque applied to the rotor 27. An increased load on the torque transfer means will cause the rotor to run ahead of the torque transfer means, while a decreased load will permit the springs 37 to advance the torque transfer means relative to the rotor.

Intermediate the periphery of the output shaft and the path of movement of the pins 35 and 36, a cam 38 projects from the face of disc 32 and presents surface 39 inclined from face 34 toward face 30 in the direction of rotation of the output shaft. In the preferred embodiment of the invention, the cam comprises a plate 38 having one rectilinear edge 90 welded or otherwise suitably secured to the face 34 upon a line perpendicular to a radius of the shaft 12, one edge 91 projecting substantially perpendicularly from said face toward the rotor face 30, and one rectilinear edge 39 inclining from the plane of said face 34, in the direction of rotation of the shaft, toward the face 30, as is most clearly shown in Fig. 4. A cam follower pin 40, perpendicular to the axis of the output shaft, is disposed between the faces 30 and 34 in contact with the inclined surface 39, and projects through an axially-elongated, radial slot 41 in hub 27, through a coincident slot 42 in the periphery of the input shaft 12 and into an open-ended socket 43, coaxially formed in the output shaft. One end of a reciprocator 44 is reciprocably received in said socket through the open end thereof, and the pin 40 is fixedly secured, as by a press fit, screw threads or the like, into a transaxial bore 45 in said reciprocator end. The opposite end of the reciprocator 44 protrudes through the open end of the socket 43 and somewhat beyond the end of the output shaft 12.

Preferably, but not necessarily, I provide, in the last-named end of the reciprocator 44, a coaxial bore 46, receiving therein one end of a plunger 47. A coiled spring 48 is confined between the inner end of plunger 47 and the bottom of bore 46, to urge plunger 47 to the right as viewed in Fig. 2. Plunger 47 has a reduced extension 49, presenting thereby a shoulder 50 abutting a screw plug 51 received in the end of reciprocator 44. Extension 49 passes through a central aperture in the plug 51 and extends beyond the end of said plug.

It will be apparent, from an inspection of the structure just described, that any relative rotation between the rotor 27 and the torque transfer means 31 will result in a camming action, by cam surface 39 against follower pin 40, to shift said pin and its associated reciprocator 44 axially with respect to the output shaft. A stop ring 52 is fixedly secured to shaft 12 to form a shoulder by which torque transfer means 31 is held in fixed axial relation relative to rotor 27.

Preferably, but not necessarily, I provide a cover 53 to enclose rotor 27, disc 32 and their associated parts. Said cover may be removably secured to the rotor 27 by means of screws or the like.

Located in the path of movement of reciprocator 44 (with its plunger 47) is a switch-actuating means indicated generally by reference numeral 54. A plate 55 is secured to the floor or the like and has secured to or integral therewith a pair of guide rails 56 and 57, parallel to the axis of the output shaft 12. A carriage 58 is slidably received between said guide rails and is adapted to be secured in any adjusted position relative thereto by means of a set screw 59 or the like. Secured to and upstanding from said carriage is a post 60, which may be welded to, or integral with, the carriage; and said post carries at its upper end a pivot pin 61. A lever 62 is journalled on said pivot pin and depends therefrom, being thus mounted for oscillation in a plane including the axis of the output shaft 12. A U-shaped member 63 is carried on the post 60 embracing the lever 62. A coil spring 64 is compressed between the lever 62 and the shoulder of an adjustable set screw 65 carried by the member 63, to urge lever 62 in a clockwise direction, and toward engagement with the plunger 44, about pivot 61 as viewed in Fig. 2. By adjusting the position of the carriage 58 upon the stationary plate 55, the angular position of the lever 62 relative to the vertical, corresponding to any related position of the reciprocator 44, can be predetermined. Under the influence of spring 64, lever 62 will resiliently hold the pin 40 in engagement with cam surface 39. It will be seen that any axial movement of reciprocator 44 will, therefore, result in a swinging movement of lever 62 about pivot 61.

Adjustably secured to carriage 58 through the medium of independent mounting means is a pair of microswitches 66 and 67 disposed on opposite sides of the free end of lever 62 in the path of movement of said lever. Said mounting means consists of two allochirally arranged L-shaped clamps 68, one leg 69 of each clamp being welded or otherwise secured to carriage 58, and the other leg 70 overlying its associated switch. A screw 71 passes through a hole in leg 70 and is threaded into a registering hole in carriage 58. By turning down on said screw, pressure is exerted through leg 70 against the switch to hold said switch in a predetermined position relative to the end of lever 62.

From an inspection of the drawings, it will be observed that adjustment of the switches 66 and 67 relative to the carriage 58, and so relative to the end of lever 62, will result in a change in sensitivity of my control; that is, moving the switches away from each other will reduce sensitivity by requiring a greater degree of movement of the associated end of lever 62 to actuate one or the other of the switches. Adjustment of the carriage 58 in the guide rails toward or away from the output shaft 12 will result in a change in the value of the predetermined load to be sustained by my control. That is, moving the carriage to either side of its illustrated position in Fig. 2 will result in a corresponding change in the position of equilibrium of the reciprocator 44.

A reversible electric motor 72 carrying a sprocket 73, is drivingly connected to shaft 25 by means of a chain 74 and a sprocket 75 on said shaft. Switch 66 is electrically connected to energize one of the series of windings of said motor for driving said motor in one direction; and the switch 67 is electrically connected to energize the other of said windings to drive the motor in the opposite direction. Alternate actuation of switches 66 and 67 will result in corresponding rotation of motor 72 to drive shaft 25 in the required direction to increase or decrease the speed of output shaft 12, thereby to maintain a constant load on motor 13.

Figures 4, 7:
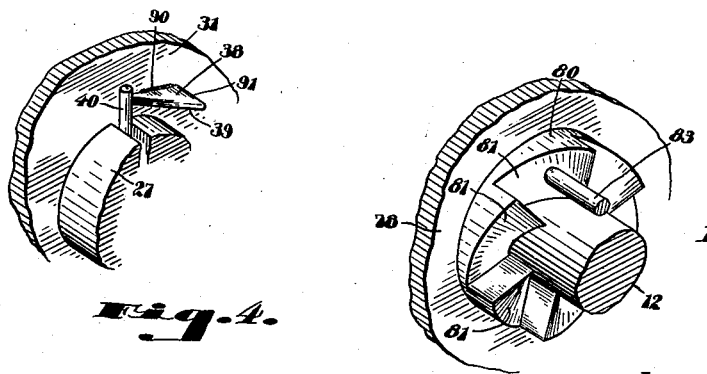
Fig. 4 is a fragmentary perspective view of a detail thereof.
Fig. 7 is a fragmentary perspective view of a detail thereof.

In Figs. 5 to 7, I have shown a modification of my torque responsive means having a rotor 76 secured to the outboard end of output shaft 12, and presenting a face 77 perpendicular to the axis of said shaft. A torque transfer means 78, similar to means 31, is loosely journalled on shaft 12 inboard from rotor 76 and confined between said rotor and a stop ring 79 fixedly secured to shaft 12. Integral with or secured to means 78 coaxial with shaft 12 is a perforated multiple cam ring 80 presenting a plurality of cam surfaces 81, inclined from the torque transfer means 76 toward the rotor face 77, in the direction of rotation of shaft 12. Reciprocably received through bores 82 in rotor 76 is an equal number of cam follower pins 83, substantially parallel to the axis of shaft 12 and disposed to ride upon the cam surfaces 81. Said pins project through and beyond the rotor 76 and carry at their outer ends a disc 84 having a central protrusion 85 for engagement with lever 62 for the purpose and in the manner of the reciprocator 44.

Pins 86, similar to pins 35, are similarly mounted on face 77 and pins 87, similar to pins 36, are similarly mounted on torque transfer means 78, said pins being similarly connected by springs 88. It will be obvious that the function of the above arrangement is substantially similar to that first described, for actuating movement of lever 62 in response to load changes on torque transfer means 31.

It will be obvious that, while I presently consider the illustrated structures to be optimum, a reversible fluid motor could be substituted for the electric motor 72, in which case the microswitches 66 and 67 would be replaced by sensitive valve devices connected to control fluid flow to drive such fluid motor in opposite directions, respectively.

I claim as my invention:

1. In a device of the class described, a rotor, an element supported from said rotor for turning movement relative to said rotor about the axis thereof, a reciprocator supported from said rotor and rotationally fixed but axially shiftable relative thereto, means providing a resilient rotary driving connection between said element and said rotor, cooperative camming means operatively associated with said element and said reciprocator and acting to control the axial position of said reciprocator in accordance with the relative rotational positions of said element and said rotor, a carriage, means supporting said carriage adjacent said reciprocator for movement toward and away from said reciprocator substantially in the direction of movement of said reciprocator, a post mounted on said carriage, a lever, means pivotally supporting said lever from said post, a pair of flow-controlling devices supported from said carriage and having actuating elements arranged in spaced, mutually-facing relation, said lever extending into cooperative relation with said actuating elements in the space therebetween, a portion of said lever being disposed in the path of movement of said reciprocator, and means resiliently urging said lever toward engagement with said reciprocator.

2. The device of claim 1 including means releasably securing said flow-controlling devices independently to said carriage for adjustment toward and from each other to vary the space between their respective actuating elements.

3. Torque-responsive control apparatus comprising a pair of flow-controlling devices, a shaft, means for driving said shaft, a rotor carried on said shaft, torque transfer means supported from said rotor for turning movement relative to said rotor about the axis thereof, means providing a resilient driving connection between said rotor and said torque transfer means to allow for relative turning movement between said rotor and said torque transfer means, a triangular plate having one edge secured to the torque transfer means upon a line substantially perpendicular to a radius from the axis of said shaft, a second edge of said plate upstanding from said one edge substantially parallel to the axis of said shaft, and the third edge of said plate being inclined from said one edge to said second edge toward said rotor in the direction of rotation of said rotor, cam follower means comprising a reciprocator received in a coaxial socket opening through the end of said shaft, a pin supported from said reciprocator substantially perpendicular to the axis of said reciprocator for movement therewith, said pin passing through an axial slot in said shaft opening through the periphery of said shaft from said socket, and cooperatively engaging the said third edge of said plate, said reciprocator being axially shiftable by said pin in response to relative rotary movement between said rotor and said torque transfer means, and actuating means disposed in the path of said reciprocator and located between said flow-controlling devices to actuate the same alternatively in response to opposite movements of said reciprocator.

4. Torque-responsive control apparatus comprising a pair of flow-controlling devices, a shaft, means for driving said shaft, a rotor carried on said shaft, torque transfer means supported from said rotor for turning movement relative to said rotor about the axis thereof, means providing a resilient driving connection between said rotor and said torque transfer means to allow for relative turning movement between said rotor and said torque transfer means, a cylinder coaxial with said shaft and supported from said torque transfer means for rotation therewith, said cylinder having a plurality of inclined surfaces on an end adjacent said rotor, said surfaces being inclined toward said rotor in the direction of rotation thereof, cam follower means comprising a series of pins (equal in number to said inclined surfaces) radially disposed about the axis of said shaft and substantially parallel thereto, one end of each pin registering with one of said inclined surfaces, said pins being reciprocably carried in a series of bores through said rotor so as to extend beyond said rotor, a member supported on said pins beyond said rotor, said member being axially shiftable by said pins in response to relative rotary movement between said rotor and said torque transfer means, and actuating means disposed in the path of said member and located between said flow-controlling devices to actuate the same alternatively in response to opposite movements of said member.

5. The device of claim 3 in which the actuating means comprises a carriage, a base releasably supporting said carriage adjacent said rotor for movement toward and from said rotor substantially in a line parallel to the axis of said shaft, a post mounted on said carriage, a lever, means pivotally supporting said lever from said post, a portion of said lever being disposed in the path of movement of said reciprocator, and in which the said pair of flow-controlling devices are supported from said carriage and have actuating elements arranged in spaced mutually-facing relation, said lever extending into cooperative relation with said actuating elements in the space therebetween.

6. The device of claim 5 including means resiliently urging said lever toward engagement with said reciprocator.

7. The device of claim 5 including means releasably securing said flow-controlling devices independently to said carriage for adjustment toward and from each other to vary the space between the respective actuating elements.

8. The device of claim 7 in which the actuating means comprises a carriage, a base releasably supporting said carriage adjacent said rotor for movement toward and from said rotor substantially in a line parallel to the axis of said shaft, a post mounted on said carriage, a lever, means pivotally supporting said lever from said post, a portion of said lever being disposed in the path of movement of said member, and in which the said pair of flow controlling devices are supported from said carriage and have actuating elements arranged in spaced, mutually-facing relation, said lever extending into cooperative relation with said actuating elements in the space therebetween.

9. The device of claim 8 including means resiliently urging said lever toward engagement with said member.

10. The device of claim 8 including means releasably securing said flow controlling devices independently to said carriage for adjustment toward and from each other to vary the space between the respective actuating elements.

JOHN S. MICHIE.

References Cited in the file of this patent

UNITED STATES PATENTS

| Number | Name | Date |
|---|---|---|
| 2,068,370 | Bush | Jan. 19, 1937 |
| 2,175,047 | Acker | Oct. 3, 1939 |
| 2,222,716 | Mageoch | Nov. 26, 1940 |
| 2,232,545 | Lum | Feb. 18, 1941 |
| 2,255,706 | Height | Sept. 9, 1941 |
| 2,329,280 | Lunken | Sept. 14, 1943 |
| 2,348,090 | Otto | May 2, 1944 |
| 2,350,913 | Mercer | June 6, 1944 |
| 2,387,533 | Schmuker | Oct. 23, 1945 |